United States Patent [19]

Dunn

[11] Patent Number: 4,738,086
[45] Date of Patent: Apr. 19, 1988

[54] HOVER-TYPE LAWN MOWER

[75] Inventor: Kenneth Dunn, Darlington, England

[73] Assignee: Flymo Limited, Newton Aycliffe, England

[21] Appl. No.: 870,760

[22] Filed: Jun. 4, 1986

[30] Foreign Application Priority Data

Jun. 5, 1985 [GB] United Kingdom ............. 8514154

[51] Int. Cl.⁴ .................................. A01D 46/00
[52] U.S. Cl. ................................ 56/12.8; 56/249
[58] Field of Search ............... 56/12.8, 13.3, 249, 56/320.1, 320.2, DIG. 3

[56] References Cited

U.S. PATENT DOCUMENTS 4,510,738  4/1985  Dunn ............................ 56/12.8

FOREIGN PATENT DOCUMENTS 2437771  of 1980  France ......................... 56/12.8
997528   of 1965  United Kingdom ........... 56/12.8

Primary Examiner—Stephen J. Novosad
Assistant Examiner—William P. Neuder
Attorney, Agent, or Firm—Baker, Maxham & Jester

[57] ABSTRACT

A mower includes a cylindrical cutting unit mounted for rotation about a substantially horizontal axis and an air pump for establishing a cushion of pressurized air for supporting the mower above a ground datum. A hood separates the cushion of air from the cylindrical cutting unit and from a grass collector.

12 Claims, 4 Drawing Sheets

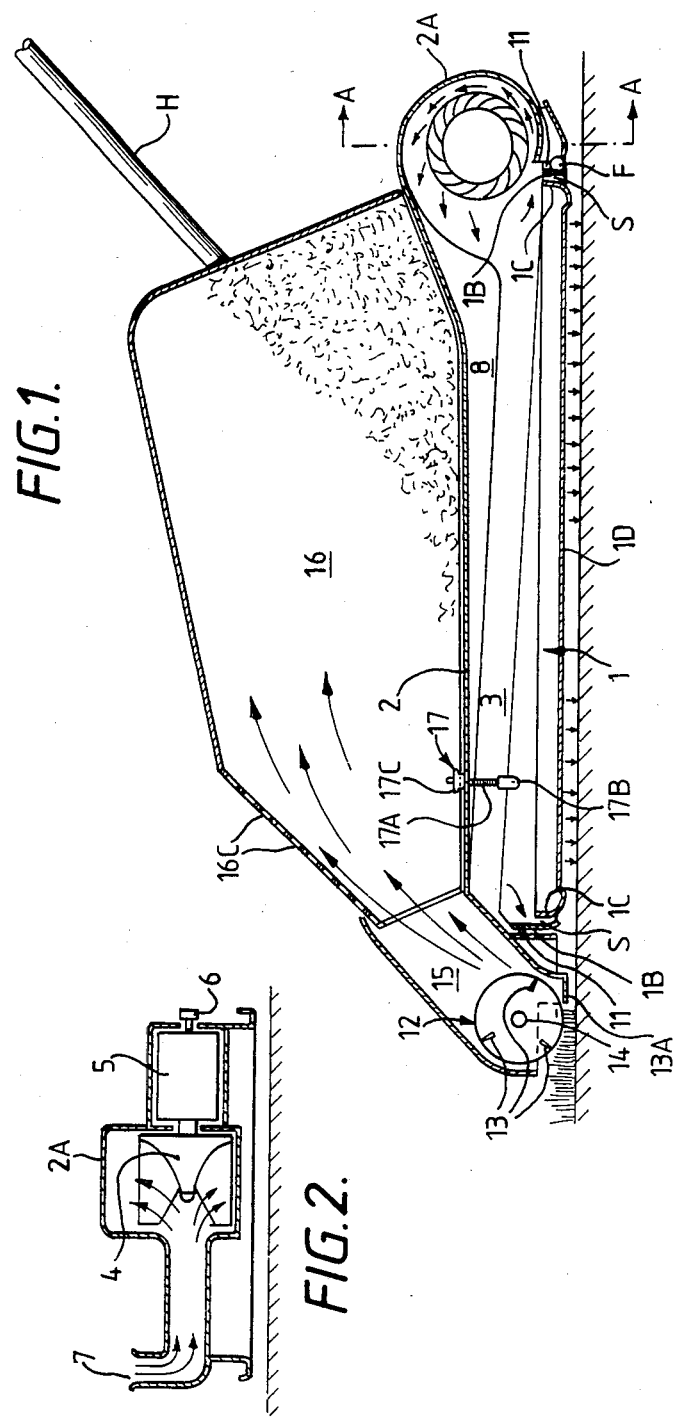

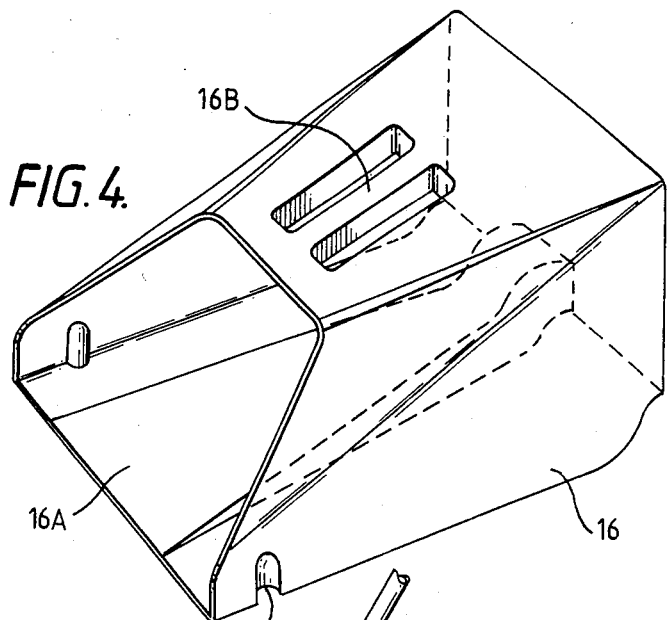
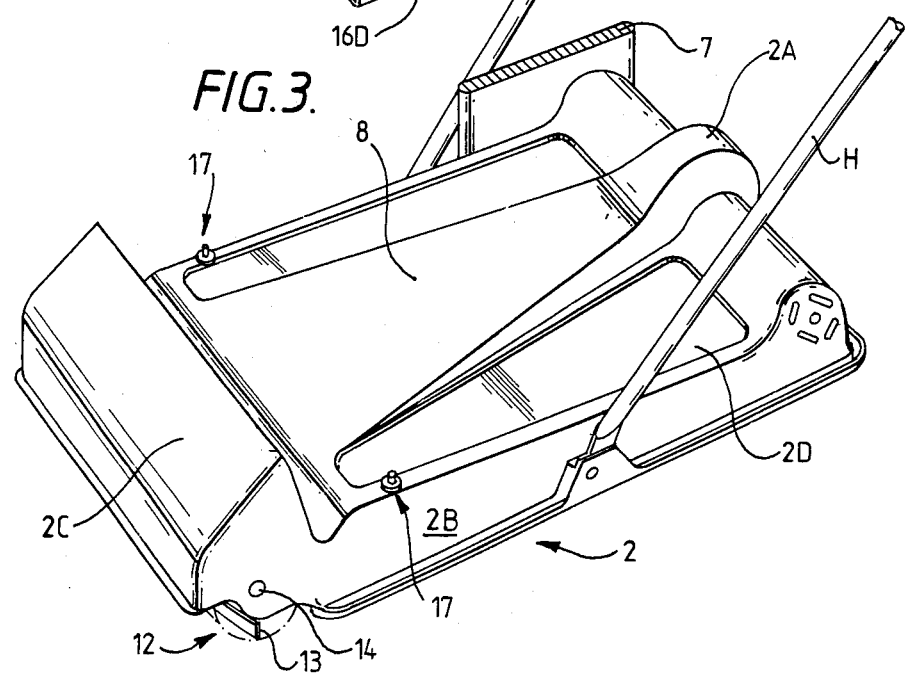

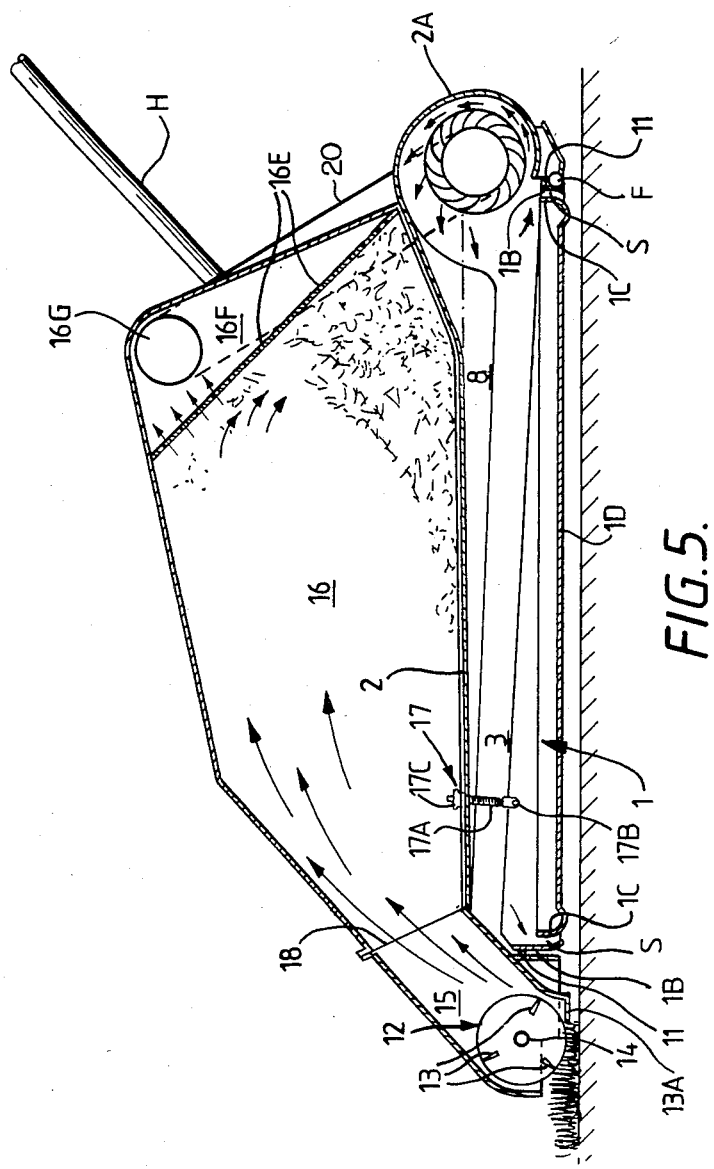

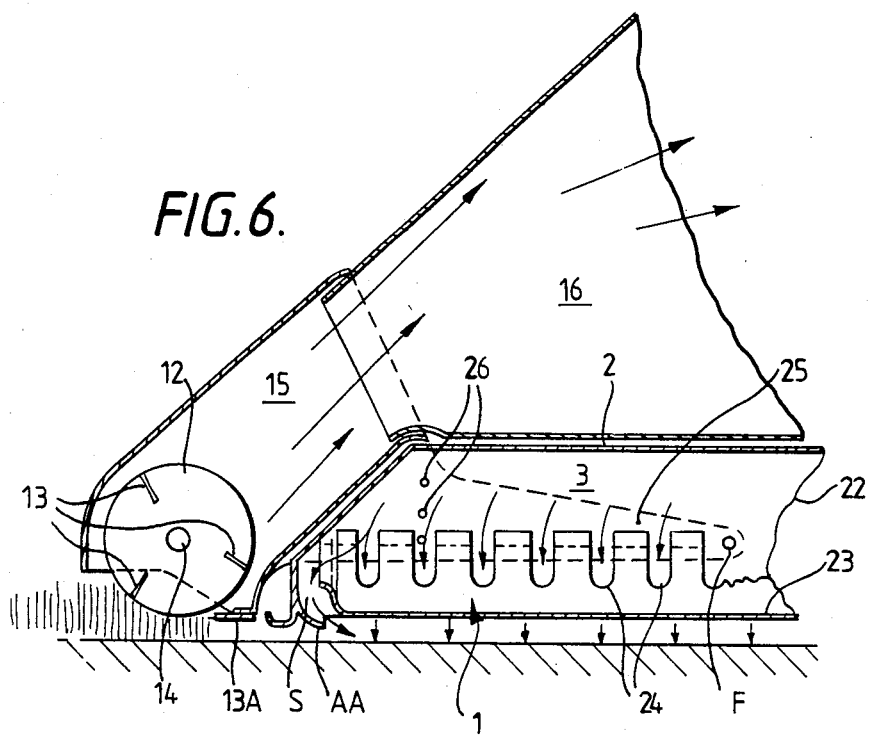
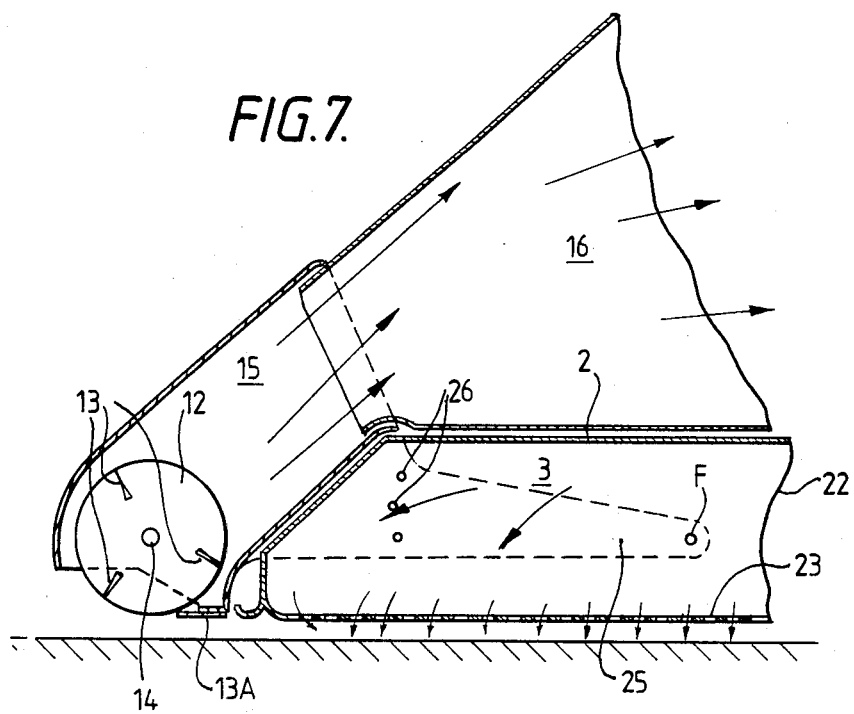

HOVER-TYPE LAWN MOWER

BACKGROUND OF THE INVENTION

This invention relates to lawn mowers. In particular, the invention relates to a hover-type lawn mower including a cylindrical cutting unit.

There are two main types of lawn mowers currently in production, namely, (1) a hover-type lawn mower which, when operative, is supported by a cushion of air and includes a cutting blade which is rotatable about a vertical axis, and (2) a lawn mower having a cylindrical cutting unit which includes a plurality of blades and which, in operation, is rotatable about a substantially horizontal axis.

Our investigations have shown that there are a number of important features to be considered when producing a lawn mower and of these, ten features are set out in a table below in order of priority allotted by lawn mower users. Furthermore, against each feature in the table is an indication as to which type of mower (either the hover (H) or the conventional cylindrical cutting mower (C)) was, in the view of the users, superior to the other for each of the features.

| | | |
|---|---|---|
| 1. | Easy/light to use | H |
| 2. | Grass collection | C |
| 3. | Quick job | H |
| 4. | Close cut | C |
| 5. | Wet grass | H |
| 6. | Finish | C |
| 7. | Long grass | H |
| 8. | Cut up to edges/obstacles | H |
| 9. | Produce stripes | C |
| 10. | Cut banks/slopes | H |

From this investigations it is apparent that a hover-type rotary mower is thought to be the more flexible in operation. It is also apparent, however, that a mower with a cylindrical cutter is considered to produce a better visual finish to a mown lawn. It is, therefore, an object of the present invention to produce a lawn mower which combines the functions, of a hover-type mower and of a mower with a cylindrical cutting unit and thereby produces a lawn mower offering great flexibility and lightness or ease of operation as well as producing a good visual finish to a mown lawn.

SUMMARY OF THE INVENTION

According to one aspect if the present invention, there is therefore provided a hover-type lawn mower comprising a cylindrical cutting unit mounted for rotation about a substantially horizontal axis and means for establishing a cushion of pressurized air for supporting the mower above a ground datum when the mower is operative, characterised in that the mower includes a first hood which serves to separate the said cushion of air from the cylindrical cutting unit and from means for collecting mown grass. As is the case with conventional hover-type lawn mowers the cushion of pressurized air is shrouded by a hood and the mower includes at least one opening for the intake of air used in the production of the air cushion. The opening(s) for intake of air may be formed in the hood.

Preferably, in a lawn mower according to the present invention, the cylindrical cutting unit and its associated cutting bar are mounted at or towards the front of the mower in the classic manner of the orthodox cylindrical mower. However, in circumstances where it is not necessary to mow tightly against, for example, a wall or other obstruction, the cylindrical cutting unit may be mounted at or towards the rear of the mower or at a position intermediate the front and rear of the mower. Where the cylindrical cutting unit is mounted at or towards the front of the lawn mower and, unless otherwise counterbalanced, there is a natural tendency for the lawn mower to adopt a "nose-down" attitude and we have found that this can be negated or at least substantially overcome by positioning the means for supplying a cushion of pressurized air, e.g. a fan unit, at or towards the rear of the lawn mower. In this preferred form of the present invention, the masses of the bulky rotating components i.e. the fan and the cutting unit, are located remotely from each other, for example, at or towards each end of the lawn mower and they are each supported directly or indirectly upon a floating hood. Conveniently, the floating hood includes a region or deck between the cutting unit and the fan unit, upon which a grass collector can be directly or indirectly supported. Further, during operation, and as the grass collector fills with clippings directed thereto from the cylindrical cutting unit the centre of gravity of the lawn mower is generally and usefully maintained at a position intermediate the cylindrical cutting unit and the fan unit affording a measure of stability to the lawn mower as a whole. Preferably, all lawn mowers should include a facility for adjusting the cutting height of the cutting unit and at the same time retain a satisfacotry level of stability irrespective of the cutting height. Generally speaking the height of the cut in a conventional hover mower can only be achieved by the use of spacers to raise and lower the actual cutting blade. This is necessarily a mechanical and manual operation. In order to afford cutting-height adjustment, the cylindrical cutting unit of a lawn mower according to the present invention is directly or indirectly supported on a floating upper hood which is hinged to a supporting structure about an axis which is substantially parallel to the axis of rotation of the cylindrical unit and disposed in spaced relationship therefrom. Conveniently, the axis of the hinge is located in a region of the upper hood remote from and in a position upstream of the cylindrical cutting unit. Preferably, the said supporting structure is a part of, or an extension of, a lower hood which, together with the upper floating hood defines a plenum chamber. Disposed between the two hoods or formed in either or both hoods is a peripheral slot or a plurality of individual slots. Other than for the existence of the slot or slots, an effective seal is disposed between the two hoods. The peripheral slot (or the plurality of slots) permit egress of pressure air to establish a "momentum curtain" of air around the plenum chamber which is fed by a high mass flow of air from the fan unit. This curtain of pressure air not only establishes the cushion of air for supportng the mower but also aids the stability of the lawn mower. Further, the slot or slots is/are preferably formed so that the curtain of air issuing therefrom is inclined inwardly thereby serving to maintain a cushion of air between the lower hood and the ground datum. This arrangement has the advantage that a lawn mower according to the present invention is capable of achieving higher hover heights than previous hover mowers and consumes less power than a typical single chamber hover-type mower. The geometry of the or each slot can be varied e.g. made convergent and/or divergent in order to create a higher velocity and, therefore, greater dynamic thrust when required. The lower hood is preferably designed to hold its relationship to the ground datum allowing the upper hood to be raised and lowered relative thereto about the rear hinge. This arrangement has the effect of raising or lowering the cutting cylinder and cutting bar to the ground datum whilst maintaining its relationship with the grass catcher. The relative positions between the floating (hinged) upper and lower hood may be achieved by one or more threaded bolt/adjustable links or a ratchet mechanism disposed between the upper and the lower hood at a position remote from the hinge.

Alternatively, cutting height adjustment can be affected by adjusting, in a known manner, the vertical position of the cylindrical cutting unit per se with respect to the upper hood thereby allowing a lower and slotted hood to be fixed relative to the upper hood.

Drive between the motor fan unit and the cutting unit can be effected by one or more of the following, namely, a torque shaft, belt drive, chain drive and gear drive. The prime mover for the drive may be an electric motor or a hand or electric start internal combustion engine. The air pump can be either a radial-flow fan or a cross-flow fan-turbo-axial-mixed flow.

In a mower according to the invention the deck may constitute a part of a grass collecting chamber and the mower may include means for removing mown grass from the collector. Such a mower preferably includes pressure means for blowing mown grass from the collector, the means comprising a hose connected to the pressure side of the means for establishing the cushion of pressurised air for supporting the mower. Conveniently, at least a portion of incoming air led to the means for establishing pressurised air is drawn to the said means via the cylindrical cutting unit and the means for collecting mown grass thereby assisting the collection of mown grass.

BRIEF DESCRIPTION OF THE DRAWINGS

Various forms of mower in accordance with the present invention will now be described by way of example, with reference to the accompanying drawings in which FIGS. 1 to 4 show a first form of mower, FIG. 5 a second form of mower, whereas FIGS. 6 and 7 show alternative constructions of plenum chamber for use with mowers in accordance with the invention.

FIG. 1 is a section taken through the longitudinal centre-line of a first form of mower;

FIG. 2 is a diagrammatic section taken along line A—A of FIG. 1;

FIG. 3 is a perspective of the first form of mower, with its grass-collector box removed;

FIG. 4 is a perspective of the grass-collector box;

FIG. 5 is a section similar to FIG. 1 of the second form of mower; and

FIGS. 6 and 7 are part sections similar to FIGS. 1 and 5 showing a closed-based and open-based plenum chamber respectively.

DESCRIPTION OF THE PREFERRED EMBODIMENTS

Referring to FIGS. 1 to 4, a lower hood 1 is hinged at F to an upper hood 2 to form a plenum chamber 3 therebetween. The upper hood 2 also includes a portion 2A, see FIGS. 1, 2 and 3 which constitutes a casing for an air pump unit 4. The air pump unit is driven by an electric motor 5 fitted with a power take-off 6 and an air inlet 7. A high mass flow of pressure air from the pump unit 4 enters the plenum chamber 3 through a channel 8 formed in the upper hood 2 as shown in FIGS. 1 and 3.

A peripheral slot S extends around the periphery of the lower hood 1 and is formed by appropriately shaped flanges 1B and 1C. The flange 1B is a downwardly extending peripheral side flange of the lower hood 1 and the flange 1C is a peripheral side flange extending upwardly from base 1D of the lower hood 1. The flanges 1B and 1C are shown in FIG. 1 to be inclined inwardly to direct pressurised air beneath and inwardly of the periphery of the base 1D. Further, a seal 11 between the upper and lower hoods substantially seals the plenum chamber 3 from atmosphere other than via the peripheral slot S.

A cylindrical cutting unit 12 having three cutting blades 13 is mounted at the forward end of the mower and has an axle 14 supported in bearings not shown carried in side panels 2B of the upper hood 2 (see FIG. 3). Forward end portions of the side panels 2B and a nose portion 2C of the upper hood 2 create a duct 15 through which grass cuttngs are thrown into a grass collector 16 removably supported upon upper deck 2D of the upper hood 2. The grass collector 16 includes a channel shaped depression 16A which conforms with the channel 8 formed in the upper hood 2, thereby serving accurately to locate the grass collector on the upper hood. A handle 16B is formed in the upper region of the collector and 16C (see FIG. 1) may be totally open or be enclosed with a grid.

The cutting unit 12 is driven by a conventional pulley, gear or other drive line (not shown) from the power take-off 6 of the air pump unit 4. Further, the cutting unit 12 operates in conjunction with a conventional fixed blade 13A.

In order to adjust the height of cut of the grass, the lower hood 1 is supported from the upper hood 2 by two adjusting screw devices 17 (See FIGS. 1 and 3). Each adjusting screw device 17 includes a threaded rod 17A pivotally attached at 17B to the lower hood 1 and an adjusting nut 17C. Thus, the axial position of the nut 17C on the rod 17 determines the angular orientation of the lower hood about the pivot F and, consequently, the height of the cut. Referring to FIG. 4, cut-outs 16D are shown for receiving the adjusting devices 17 and the cut outs are usefully made sufficiently larger to permit adjustment of the devices 17 when the collector 16 is in a position for collecting grass-cutting. The mower is fitted with a handle H the angle of which may be adjusted in conventional manner by a user.

The mower shown in FIG. 5 is a modification of that shown in FIGS. 1 to 4 in so far that the manner in which grass cuttings are collected is different. In the mower of FIGS. 1 to 4, grass cuttings are urged into the collector 16 by virtue of the momentum applied to the cuttings by the rotatable cylindrical cutter 12 in the conventional manner. On the other hand, in the mower of FIG. 5 grass cuttings are passed into the collector 16 not only under the influence of momentum applied by the cylindrical cutter 12 but also under a suction force applied by a fan in the manner described in our U.S. Pat. No. 4,361,001. In FIG. 5, the grass catcher is adequately sealed against the ambient atmosphere along junction 18 between the duct 15 and the catcher 16. It will also be appreciated that region 16C of the collector used with a mower according to FIG. 1 is effectively closed in the collector used with the mower according to FIG. 5. The collector for the FIG. 5 mower is divided by a grid 16E to form a region 16F of negative pressure which is applied thereto via ducting 20 between the unit 4 and aperture 16G through which air is pulled by the unit 4.

One problem not infrequently encountered with conventional cylinder mowers is the collection of long pieces of grass around the bearings of the cylindrical cutter unit. In an attempt to reduce the effect of this problem pressure air or suction tubes may be led to the region of the bearings to either blow or suck grass away from the bearings.

One problem with conventional hover-type mowers is that they cannot be used satisfactorily to cut over the edges of lawns because the usual drop between lawn and garden border results in a loss of the pressure pad. In an attempt to reduce this problem the pressure pad of a mower according with present invention is preferably contained within the axial length of the cutting unit.

The outlet of the slots S in the mowers of FIGS. 1 to 5 may be modified compared with that as shown and may be directed downwardly or outwardly and may be restricted to constitute a venture. Means may also be included to vary the actual slot width.

Although, reference has been made to adjust the height of grass cut by the device 17, the actual height of cut may be varied using a conventional mechanism for adjusting the vertical position of the cylindrical cutter 12.

The modifications shown in FIGS. 6 and 7 indicate the use of a single box plenum chamber as opposed to a plenum chamber formed between lower 1 and upper 2 hoods. In FIG. 6 the single box plenum chamber includes a deck 2 for supporting the collector 16, opposite side walls 22 and a lower deck 23. The lower deck 23 has upstanding flanged walls having a plurality of notches 24 permitting pressure air from the plenum chamber 3 to exit through the slot S in a manner similar to FIGS. 1 and 5.

In FIG. 7, the lower deck 23 of single box plenum chamber is perforated or left totally open to provide direct aspiration of pressure air from the chamber 3. Further, if desired, a peripheral slot or slots may also be incorporated in the single box plenum chamber to establish a curtain of high pressure air as shown in FIGS. 1 and 5. If desired, a return lip designated AA may be omitted from the lower deck 23.

In order to adjust the height of cut using mowers of FIGS. 6 and 7, the cylindrical cutter 12 and associated side, top and bottom walls of duct 15 is carried on side members 25 pivoted at F. The actual position of the side members 25 may be adjusted by a screw device similar to 17 or, alternatively, a ratchet or leaf-spring detent arrangement may be used to hold the side members in any one of a plurality of positions indicated by circles 26. Constructional details of such alternative adjustment are not described herein since such details are common engineering practice.

I claim:

1. A hover-type lawn mower, comprising: a cylindrical cutting unit mounted for rotation about a substantially horizontal axis, means for establishing a cushion of pressurised air for supporting the mower above a ground datum, means for collecting mown grass, and a first hood separating the cushion of air from the cylindrical cutting unit and from the grass collecting means.

2. A mower according to claim 1 wherein the first hood is hinged to a supporting structure about an axis which is substantially parallel to the axis of rotation of the cylindrical cutting unit and which is disposed in spaced relationship therefrom.

3. A mower according to claim 2 wherein the supporting structure is a part of a second hood which together with the first hood defines a plenum chamber and further wherein at least one peripheral slot is disposed between the two hoods to direct pressurised air from the plenum chamber into a region wherein the cushion of air for supporting the mower above the ground datum is established.

4. A mower according to claim 1 wherein the cylindrical cutting unit is mounted adjacent the front of the mower and the means for establishing the cushion of pressurized air is located adjacent the rear of the mower.

5. A mower according to claim 4 wherein the cylindrical cutting unit and the means for establishing a cushion of pressurised air are supported on the first hood which includes a deck disposed therebetween.

6. A mower according to claim 5 wherein the grass collecting means is removably carried by the deck and the mower further comprises a chute for directing mown grass from the cylindrical cutting unit into the grass collecting means.

7. A mower according to claim 5 wherein the deck constitutes a part of a grass collecting chamber inside the grass collecting means and the mower further comprises means for removing mown grass from the grass collecting means.

8. A mower according to claim 1 wherein at least a portion of incoming air led to the means for establishing pressurised air is drawn thereto via the cylindrical cutting unit and the grass collecting means thereby assisting the collection of mown grass.

9. A hover-type lawn mower, comprising: a cylindrical cutting unit mounted for rotation about a substantially horizontal axis, means for establishing a cushion of pressurized air for supporting the mower above a ground datum, means for collecting mown grass, and a first hood separating the cushion of air from the cylindrical cutting unit and from the grass collecting means, the first hood being hinged to a supporting structure about an axis which is substantially parallel to the axis of rotation of the cylindrical cutting unit and which is disposed in spaced relationship therefrom.

10. A mower according to claim 9 wherein the supporting structure is a part of a second hood which together with the first hood defines a plenum chamber and further wherein at least one peripheral slot is disposed between the two hoods to direct pressurized air from the plenum chamber into a region wherein the cushion of air for supporting the mower above the ground datum is established.

11. A mower according to claim 9 wherein the cylindrical cutting unit is mounted adjacent the front of the mower, the means for establishing the cushion of pressurized air is located adjacent the rear of the mower, the cylindrical cutting unit and the means for establishing the cushion of pressurized air are supported on the first hood which includes a deck disposed therebetween, the grass collecting means is removably carried by the deck, and the mower further comprises a chute for directing mown grass from the cylindrical cutting unit into the grass collecting means.

12. A mower according to claim 9 wherein the cylindrical cutting unit is mounted adjacent the front of the mower, the means for establishing the cushion of pressurized air is located adjacent the rear of the mower, the cylindrical cutting unit and the means for establishing the cushion of pressurized air are supported on the first hood which includes a deck disposed therebetween, the deck constitutes a part of a grass collecting chamber inside the grass collecting means, and the mower further comprises means for removing mown grass from the grass collecting means.

* * * * *